United States Patent
Bieringer et al.

(10) Patent No.: US 9,889,997 B2
(45) Date of Patent: Feb. 13, 2018

(54) DENESTER WITH ADJUSTABLE INCLINED MAGAZINE

(71) Applicant: Multivac Sepp Haggenmüller GmbH & Co. KG, Wolfertschwenden (DE)

(72) Inventors: Stefan Bieringer, Bad Grönenbach (DE); Alireza Taghipour, Kempten (DE)

(73) Assignee: MULTIVAC SEPP HAGGENMUELLER SE & CO. KG, Wolfertschwenden (DE)

(*) Notice: Subject to any disclaimer, the term of this patent is extended or adjusted under 35 U.S.C. 154(b) by 0 days.

(21) Appl. No.: 14/942,393

(22) Filed: Nov. 16, 2015

(65) Prior Publication Data

US 2016/0137434 A1   May 19, 2016

(30) Foreign Application Priority Data

Nov. 18, 2014 (EP) .................................. 14193681

(51) Int. Cl.
*B65G 59/00* (2006.01)
*B65H 3/00* (2006.01)
(Continued)

(52) U.S. Cl.
CPC ......... *B65G 59/108* (2013.01); *B65G 59/065* (2013.01); *B65G 57/00* (2013.01);
(Continued)

(58) Field of Classification Search
CPC .......... B65G 59/10; B65G 59/06; B65G 1/08; B65G 59/101; B65G 59/102; B65G 59/103; B65G 59/104; B65G 59/105; B65G 59/106; B65G 59/107; B65G 57/00; B65G 57/08; B65G 57/081; B65G 57/16; B65G 5757/165; B65G 59/065; B65G 59/08; B65G 60/00; B65G 57/32; B65G 61/00; B65G 47/248; B65G 47/252; B65G 47/256; B65G 57/183; B65G 57/28; B65G 59/00; B65G 59/067; B65G 59/068; B65G 57/035; B65G 57/06; B65G 57/11; B65G 57/14; B65G 57/18; B65G 57/245; B65G 33/16; B65G 59/063; B65G 59/108; B65H 29/00; B65H 2301/5132; B65H 2301/5133; B65H 15/00; B65H 15/02; B65H 2402/35;
(Continued)

(56) References Cited

U.S. PATENT DOCUMENTS 4,048,915 A    9/1977  Martin
4,054,212 A *  10/1977 Mueller ............... B65G 59/103
                                          141/174
(Continued)

FOREIGN PATENT DOCUMENTS

JP   2002179248 A   6/2002
NL      7806978 A   1/1980

*Primary Examiner* — Jeffrey Shapiro
(74) *Attorney, Agent, or Firm* — Husch Blackwell LLP

(57) ABSTRACT

The invention relates to denester for use with a tray sealer. The denester includes a magazine for accommodating at least one stack of trays. The magazine includes a first vertical guide and a second guide, the second guide capable of being inclined at an inclination relative to the first guide. The inclination of the second guide is adjustable to accommodate destacking of the trays in the stack of trays.

14 Claims, 3 Drawing Sheets

(51) Int. Cl.
  *B65G 59/10* (2006.01)
  *B65G 59/06* (2006.01)
  *B65G 57/00* (2006.01)
  *B65G 57/08* (2006.01)
  *B65G 57/16* (2006.01)
  *B65G 57/06* (2006.01)
  *B65G 59/08* (2006.01)
  *B65G 60/00* (2006.01)

(52) U.S. Cl.
  CPC .............. *B65G 57/06* (2013.01); *B65G 57/08* (2013.01); *B65G 57/16* (2013.01); *B65G 57/165* (2013.01); *B65G 59/08* (2013.01); *B65G 59/10* (2013.01); *B65G 60/00* (2013.01)

(58) Field of Classification Search
  CPC .... B65H 31/3081; B65H 31/34; B65H 31/36; B65H 1/00; B65H 1/02; B65H 1/04; B65H 2301/4222; B65H 3/085; B62B 3/16; B62B 3/165; B62B 35/50; B62B 35/04; B62B 43/14; B62B 43/145; B62B 43/126; B21D 43/20; B21D 43/22; B21D 43/24
  USPC ......... 414/795.6, 795.7, 795.4, 796.3, 797.4, 414/798, 798.1, 788, 788.1, 788.2, 788.3, 414/788.5, 788.8, 788.9, 789.2, 792.7, 414/792.2, 793.8, 793.9; 221/238
  See application file for complete search history.

(56) References Cited

U.S. PATENT DOCUMENTS

| | | | | |
|---|---|---|---|---|
| 4,699,371 | A | * | 10/1987 | Ettischer .................. B65H 1/06 221/285 |
| 5,064,093 | A | * | 11/1991 | Davis ................... B65G 59/108 221/222 |
| 5,228,826 | A | * | 7/1993 | Bryde-Hansen ....... B65G 57/28 414/798.2 |
| 5,388,951 | A | * | 2/1995 | Tolliver .................... B66C 1/24 414/746.5 |
| 2008/0286078 | A1 | * | 11/2008 | Kroessmann ............ A24C 5/35 414/222.11 |
| 2011/0229297 | A1 | * | 9/2011 | Frazier .................. B65G 59/10 414/795.6 |

* cited by examiner

DENESTER WITH ADJUSTABLE INCLINED MAGAZINE

CROSS-REFERENCE TO RELATED APPLICATIONS

This application claims priority to European Patent Application Number 14193681.5 filed Nov. 18, 2014, to Stefan Bieringer et al., currently pending, the entire disclosure of which is incorporated herein by reference.

FIELD OF THE INVENTION

The present invention relates to a denester for use with a packaging machine, such as a tray sealer, for destacking trays.

BACKGROUND OF THE INVENTION

U.S. Pat. No. 5,064,093 discloses a denester with a vertically oriented magazine for accommodating a stack of trays. U.S. Pat. No. 4,048,915 discloses a denester with a magazine that is inclined relative to the drop-down surface. In both cases, the number of trays and the weight of the stack of trays are limited, since otherwise the contact load of the tray flange on the destacking screw would become so high that the tray flange may deform. During the destacking process of the individual trays, the contact load decreases continuously until the magazine will be empty. Accordingly, a need exists for a denester without the above-mentioned limitations.

SUMMARY OF THE INVENTION

It is the object of the present invention to provide a denester that can accommodate a larger number of trays so that the magazine will have to be refilled less often. It is also an object of the present invention to provide a denester that can allow the contact load during the destacking process to remain constant to the greatest possible extent.

The denester according to one embodiment of the present invention comprises a magazine for accommodating at least one stack of trays. The magazine can comprise a first vertical guide and a second guide, and the second guide can be inclined at an inclination relative to the first guide. The denester can be characterized in that the inclination is adjustable. The advantage in comparison with a rigid system is that the stack comprising the trays can be enlarged significantly and that the capacity can thereby be increased. Simultaneously, there can be an increase in the reliability of the destacking process due to a more constant contact load.

The inclination can be automatically adjustable so as to automatically obtain an inclination that is appropriate for the stack and which can provide an optimized destacking process.

According to one embodiment of the present invention, the inclination is adjustable within an angle of from 30° to 70°, and preferably 50° to 70°, which can provide for a largely constant contact load of the tray flange, such as on the destacking screws, and the contact load can be adapted to the characteristics of the trays and of the stack, respectively. The tray flange can be a boundary area that projects outwards at the side and that can be grasped by the destacking screws so as to separate individual trays from the stack and drop them onto a conveying unit.

According to one embodiment of the present invention, a third curved guide is provided between the first and the second guide so as to establish a transition between the second guide accommodating the stack of trays and the vertical guide feeding the trays to the destacking screws.

According to one particular embodiment, the third guide comprises an outer guide with an outer radius that can be changeable for optimizing the movement of the trays or stack of trays along the transition, e.g. with respect to the friction of the tray flanges on the inner surfaces of the guide, and for increasing the process reliability of the denester.

The first, second and third guides can be adjustable with respect to their inside dimensions so that they can be adapted to various outside dimensions of a tray flange, i.e., to the length and width of the tray flange.

According to one embodiment of the present invention, the second guide has a length of at least 600 mm.

The second guide can also be rotatably attached to a framework of the denester, so as to allow an adjustment of inclination in a structurally simple manner.

According to an advantageous embodiment of the present invention, at least one spring element is provided as a connection between the second guide and a frame of the denester, so as to automatically adapt the inclination depending on the weight of the stack. The spring element can be a gas compression spring having an approximately constant pressure force over the spring travel; however, other types of spring elements can also be suitably used.

According to one embodiment of the present invention, a spring force of the spring element is adjustable so that the automatic inclination adjustment can be adapted to various weights in the case of different shapes, sizes and/or weights of trays.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Like components are designated by like reference numerals throughout the figures.

DETAILED DESCRIPTION OF THE INVENTION

Figure 1:
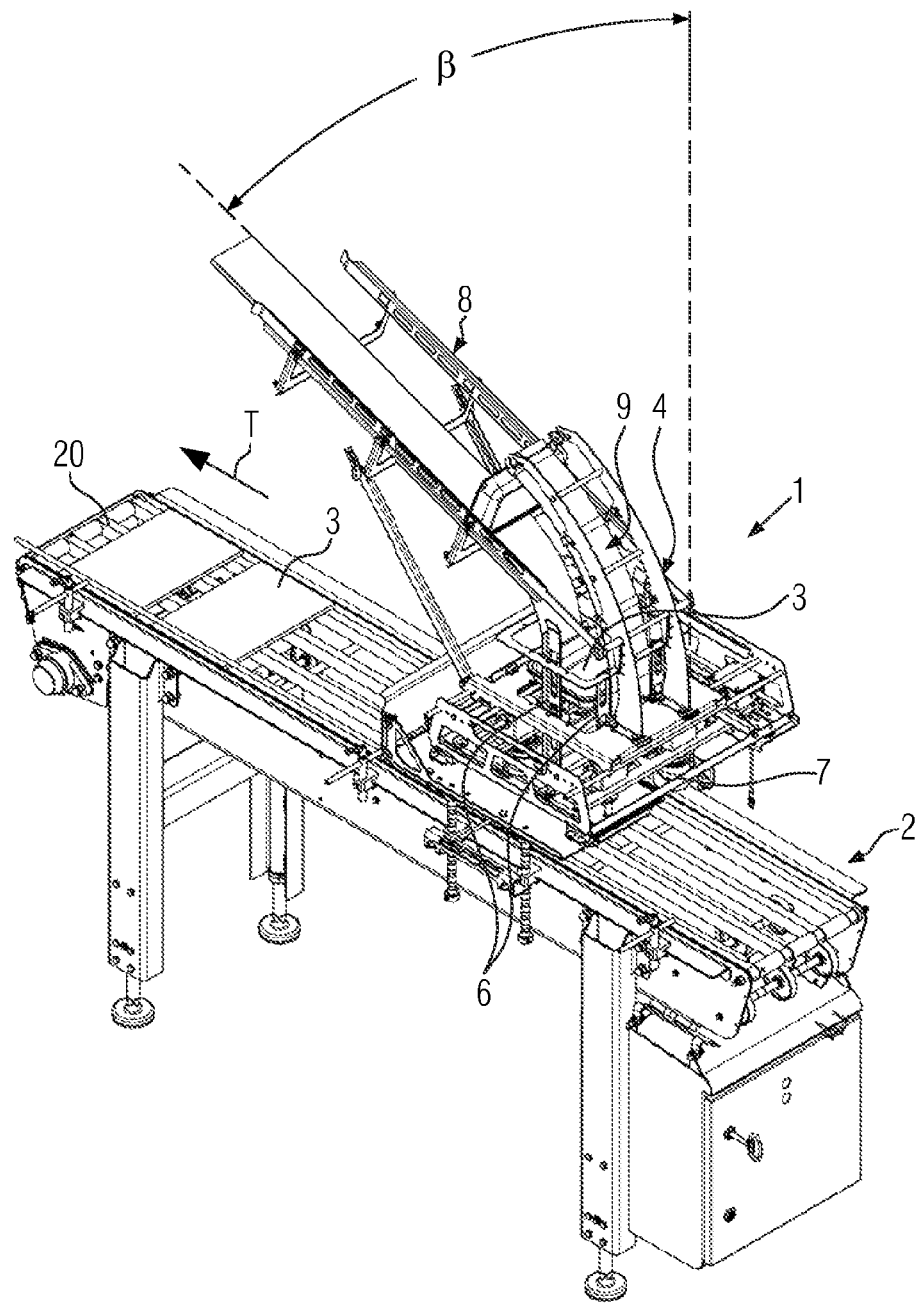
FIG. 1 is a perspective view of a denester according to one embodiment of the present invention.

The invention will now be described with reference to the drawing figures, in which like reference numerals refer to like parts throughout. For purpose of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
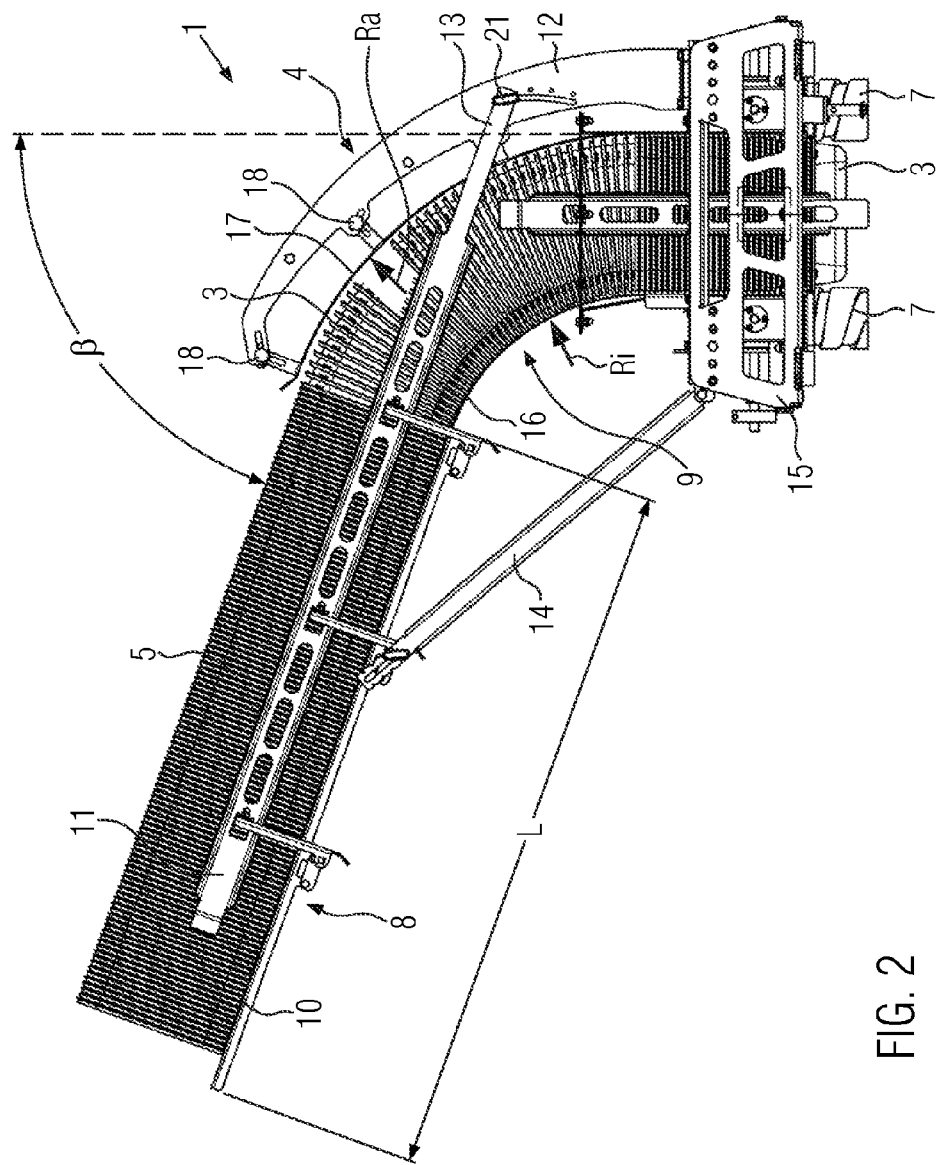
FIG. 2 is a side elevation view of the denester of FIG. 1, illustrating the denester at a first position according to one embodiment of the present invention.

FIG. 1 shows a denester 1 according to one embodiment of the present invention, which can arranged on a conveying unit 2 for trays 3. The denester 1 can comprise a magazine 4, which can be used for accommodating a stack 5 of trays 3, as shown in FIG. 2. The magazine 4 can comprise a first vertical guide 6 in the area of a plurality of destacking screws 7, as shown in FIG. 1. The magazine 4 can further comprise a second guide 8 in the upper area of the magazine 4, as shown in FIG. 1. The second guide 8 for the stack 5 can be inclined at an inclination β relative to the first guide 6 or a vertical plane. According to one embodiment of the present invention, the first guide 6 and the second guide 8 have provided between them a third curved guide 9. New trays 3 can be placed onto the second guide 8 and slide, due to gravity, automatically towards the first guide 6. New trays 3 can also be otherwise urged toward the first guide 6 by other means in alternative embodiments. Individual trays 3 destacked onto the conveying unit 2 can be supplied by means of driven conveyor belts 20 in a conveying direction T to a subsequent station, such as a filling station of a tray sealer.

FIG. 2 shows, in a side view, the denester 1, according to one embodiment of the present invention, with a full magazine 4 at a first position. At this first position, the second guide 8 can be inclined relative to the first vertical guide 6 at an inclination angle β. The inclination angle β according to one particular embodiment can be approximately 70°. The second guide 8 can comprise a lower support 10 and two laterally arranged abutments 11. The lower support 10 and the two abutments 11 can be rigidly connected to one another. The second guide 8 can be rotatably arranged on a framework 12 of the denester 1 by means of the two abutments 11 in that a respective end 13 of the abutments 11 can be supported on the framework 12, such as by means of a screw joint or a bolted joint 21. The second guide 8 can be connected to a frame 15 of the denester 1 by one or more compression springs 14, such as gas compression springs. The compression springs 14 each can have one of their ends connected to the second guide 8 and the other end connected to the frame 15 of the denester 1, thus supporting the stack 5 and the second guide 8 against the frame 15. The second guide 8 can have a length L, which can be at least 600 mm according to one particular embodiment of the present invention.

The mode of operation of the inclination adjustment of the second guide 8 will be explained in more detail in the following. The denester 1 can destack individual trays by means of the destacking screws 7. Additional trays 3 of the stack 5 can slide down automatically, or be urged by any suitable means. This can lead, during operation, to a reduction of the height of the stack 5 and to a reduction of the weight through the trays 3 on the second guide 8. In the case of denesters 1 having a high destacking performance, the stack 5 may be used up within a few minutes. Continuous refilling can therefore necessary.

Figure 3:
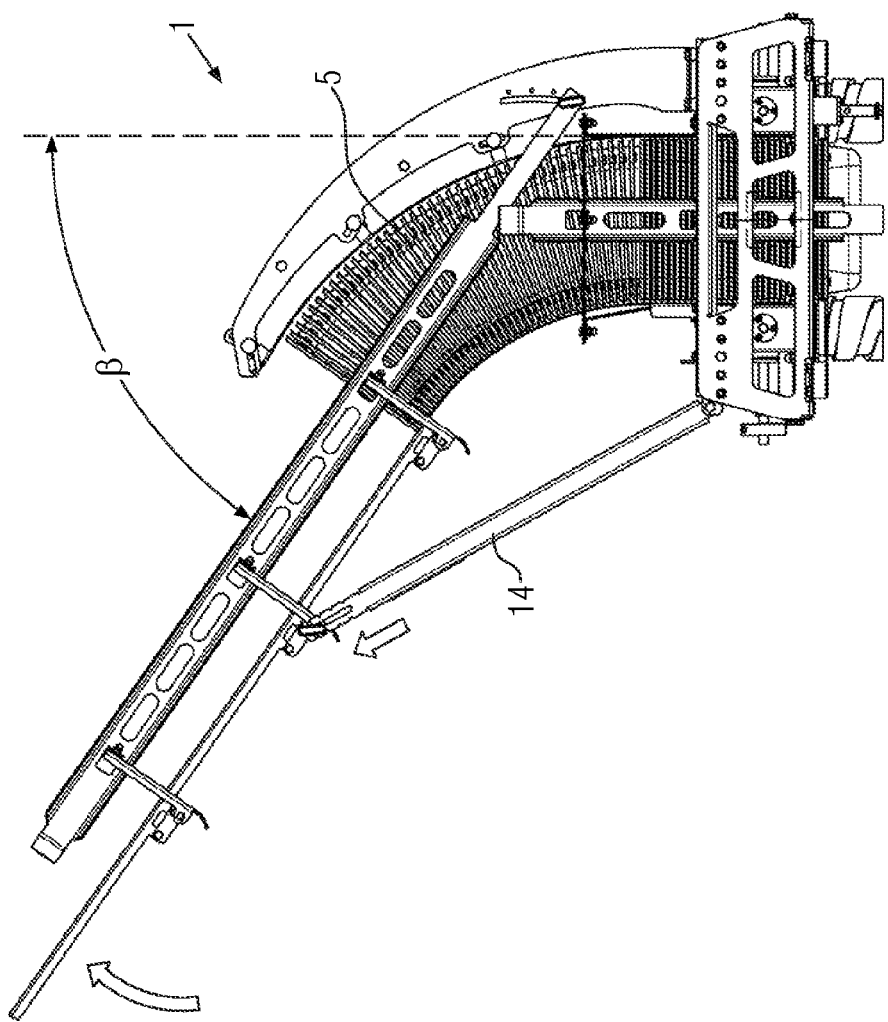
FIG. 3 is a side elevation view of the denester of FIG. 1, illustrating the denester at a second position according to one embodiment of the present invention.

FIG. 3 shows, in a side view, the denester 1, according to one embodiment of the present invention, with a partially empty magazine 4 at a second position. Due to the reduced number of trays 3 in the stack 5, the weight force can be decreased, which can have the effect that the smaller the number of trays 3 on the second guide 8 is, the further up the compression springs 14 can push the second guide 8 in the direction of the arrow, as shown in FIG. 3, and increase the inclination of the second guide 8, thereby reducing the inclination angle β. According to one embodiment, and as shown in FIG. 3, the inclination β can be approximately 55°. The pressure and/or the mounting position of the gas compression springs 14 can be used for influencing the inclination β depending on the weight of the trays 3. The pressure of the stack 5 on the lowermost tray 3 to be destacked can thus be kept approximately constant. In alternative embodiments of the present invention, the gas compression spring 14 is replaced by a pneumatic cylinder having, by means of a pressure controller that can be adapted to be controlled in response to the pressure of the stack 5 on the lowermost tray 3 to be destacked, a force profile for adjusting the inclination β automatically in accordance with the stack 5. As another alternative, also a linear motor drive may be provided instead of the gas compression spring 14.

The third guide 9 can comprise an inner guide 16 with an inner radius Ri and an outer guide 17 with an outer radius Ra. The outer guide 17 can be connected to the framework 12 at a plurality of mounting points 18 and each of these mounting points 18 can be changed in position relative to the outer guide 17 and/or the framework 12. This can have the effect that the curvature of the outer guide 17 relative to the trays 3 can be adapted so as to prevent jamming or an excessively high friction of the trays 3 in the magazine 4 in the third guide 9.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereto, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A denester comprising a magazine for accommodating at least one stack of trays,
    wherein said magazine comprises;
    a frame;
    a first guide having a first entry end and a first exit end, said first guide operably connected to the frame and configured for guiding the a movement of a first portion of said at least one stack of trays in a substantially vertical direction;

a second guide having a second entry end and a second exit end, the second guide configured for guiding a movement of a second portion of said at least one stack of trays in a downward angular direction, wherein said second guide is positionable in a plurality of inclined positions, each inclined position forming an inclination angle relative to said first guide; and a third guide having a third entry end and a third exit end, the third guide disposed between the first vertical guide and the second vertical guide such that the second exit end of said second guide is operably connected to said third entry end of said third guide and said third exit end of said third guide is operably connected to the first entry end of said first guide;

said second guide being operably connected to said frame by an adjustment member, wherein said adjustment member is operable to adjust the inclination angle of said second guide relative to said first guide; and wherein said third guide comprises a curved transition between said second guide and said first vertical guide, said third guide configured for adjusting a radius of the curved transition to match the inclination angle upon adjustment of the inclination angle by said adjustment member.

2. The denester according to claim 1, wherein said inclination angle is automatically adjustable.

3. The denester according to claim 1, wherein said inclination angle is adjustable within a range of approximately 30 degrees to approximately 70 degrees.

4. The denester according to claim 1, wherein the third guide includes an inner guide having an inner radius and wherein said inner radius adjusts to match the adjustment of said inclination angle by said adjustment member.

5. The denester according to claim 4, wherein said third guide comprises an outer guide having an outer radius, said outer radius adjusts to match the adjustment of said inclination angle by said adjustment member.

6. The denester according to claim 1, further comprising a weight sensor or a compression sensor to measure a weight of the trays in said at least one stack of trays bearing upon a lowermost tray in said at least one stack of trays, wherein said adjustment member adjusts the inclination angle so that said weight bearing on said lowermost tray is kept substantially constant through the operation of said denester.

7. The denester according to claim 1, wherein said first guide, said second guide and said third guide are adjustable with respect to their respective inside dimensions, so that they are each capable of being adapted to various outside dimensions of an individual tray from said stack of trays.

8. The denester according to claim 1, wherein said second guide has a length of at least 600 mm.

9. The denester according to claim 1, wherein said second guide is rotatably attached to a framework of said denester and wherein said framework is coupled to said frame.

10. The denester according to claim 1, further comprising at least one spring element operably connecting said second guide to said frame of said denester.

11. The denester according to claim 10, wherein said at least one spring element is at least one gas compression spring.

12. The denester according to claim 10, wherein a spring force of said at least one spring element is adjustable.

13. The denester according to claim 1, further comprising a conveyor disposed below said first vertical guide, and a plurality of destacking screws disposed proximate said exit end of said first vertical guide for individually engaging one tray of said at least one stack of trays for depositing said tray on said conveyor.

14. The denester according to claim 13, further comprising a weight sensor or a compression sensor to measure a weight of the trays in said at least one stack of trays bearing upon a lowermost tray in said at least one stack of trays, wherein said adjustment member adjusts the inclination angle so that said weight bearing on said lowermost tray is kept substantially constant through the operation of said denester.

* * * * *